United States Patent [19]

Harden

[11] Patent Number: 4,877,203
[45] Date of Patent: Oct. 31, 1989

[54] METHOD AND APPARATUS FOR DISPERSING CREMATED REMAINS

[76] Inventor: Bonnie J. Harden, 3279 Silverthorne Dr., Fort Collins, Colo. 80526

[21] Appl. No.: 98,500

[22] Filed: Sep. 18, 1987

[51] Int. Cl.$^4$ ............................................. B64D 1/16
[52] U.S. Cl. ......................................... 244/136; 27/1; 222/400.7; 239/171
[58] Field of Search ...................... 244/1 R, 136; 27/1, 27/6, 7, 28; 222/146, 400.3, 161, 557; 239/171, 142, 144

[56] References Cited

U.S. PATENT DOCUMENTS

| | | | |
|---|---|---|---|
| 286,718 | 10/1883 | Linton | 244/136 |
| 2,254,157 | 8/1941 | Shaw | 244/136 |
| 2,539,816 | 1/1951 | Denlinger | 244/136 |
| 3,140,013 | 7/1964 | Schecter | 244/136 |
| 3,167,844 | 2/1965 | Bachofner | 27/1 |
| 3,732,602 | 5/1973 | Vigh | 27/1 |
| 3,777,978 | 12/1973 | Manicatide | 244/136 |
| 4,199,848 | 4/1980 | Kohnert | 27/1 |
| 4,260,108 | 4/1981 | Maedgen | 244/136 |
| 4,603,644 | 8/1980 | Brookes . | |

Primary Examiner—Galen L. Barefoot
Attorney, Agent, or Firm—Luke Santanglo

[57] ABSTRACT

Both methods and various embodiments of an apparatus are disclosed which address the dispersal of cremated remains. The methods involve steps which avoid any tendency to retain cremated remains within a container, steps which assure dispersal of cremated remains in only one desired direction, and steps which assure continuous and complete dispersal of all cremated remains. The invention also presents several embodiments including both a fabric bag and a mechanical apparatus for dispersing cremated remains. The disclosure addresses the utilization of existing air currents, the application of the invention to aerial dispersion, and designs which address simplicity of operation and manufacture. A fabric apparatus is disclosed which includes both an outer shell and an inner liner and a flap to seal the apparatus. The fabric apparatus presented may be rolled and transported by means of a handle. The mechanical apparatus presented discloses a sealed container having a hinged door which may be spring loaded and a trigger which may remotely activate the hinged door to release the container's contexts.

21 Claims, 3 Drawing Sheets

Fig_6

Fig_7

Fig_8

Fig_11

Fig_9

Fig_12

Fig_10

METHOD AND APPARATUS FOR DISPERSING CREMATED REMAINS

BACKGROUND OF THE INVENTION

This invention relates to methods and embodiments of an apparatus to disperse cremated remains. The methods involve steps which assure a reverent dispersal of the remains and are suitable for dispersal in a variety of situations ranging from cliffs or tall buildings to moving objects or vehicles even including aircraft. The embodiments of the apparatus relate to a variety of devices to achieve these desired goals and which also allow for simple transportation of the cremated remains. Specifically, both the methods and embodiments of the apparatus presented address the peculiar difficulties inherent to dispersing cremated remains. These difficulties are a direct result of consideration of the emotional and psychological needs of both relatives of the deceased and the person accomplishing the dispersal. The present invention addresses the need of a ceremony which is sufficiently reverent so that relatives of the deceased could be present if desired. Through proper dispersal it is believed that such relatives may be left with a pleasant and even enjoyable mental image as a final memory of a loved one.

The methods and embodiments of the apparatus presented provide for dispersal which is both continuous, complete, and in one desired direction. Also presented are methods and devices which utilize existing air currents for dispersal. In one embodiment the remains are dispersed through utilization of a fabric bag which smoothly unrolls. In an alternative embodiment, a rigid container is utilized. This rigid container is opened to allow air currents to disperse the remains in a reverent manner. Each of these devices are particularly suitable for use in one most difficult yet highly desirable application—namely dispersal from a rapidly moving aircraft.

Prior to the present invention, those individuals and families who desired dispersal of the cremated remains of a loved one had little choice but to either having a funeral director or cremator do it on an ad hoc basis, request that a friend attempt the dispersal, or to accomplish such dispersal by themselves. Although such an event might appear simple enough to accomplish, in actual practice the extreme emotional character of the event and the characteristics of the cremated remains themselves caused difficulties which tended to destroy the aesthetic and reverent characteristics necessary. Contributing to the reverence and aesthetic qualities of the event, the present invention also specifically allows for dispersal solely by existing air currents. The relatives or loved ones of the deceased are thus afforded the pleasant memory of dispersal by natural forces rather than automated devices.

Interestingly, little effort has been directed at providing either methods or an apparatus for accomplishing such dispersal. Although devices such as hand spreaders as are used for domestic grass seed or fertilizer application may have been employed, such devices, if used, would not provide the features of the present invention and would act to disperse the remains through mechanical dispersal rather than existing air currents. It is believed that this indicates the simple fact that funeral directors and cremators in general have failed to recognize the problems encountered for reverent dispersal of cremated remains even though such needs have no doubt been long felt through perhaps centuries of occurrences. The fact that those skilled in disposing of remains have failed to recognize these problems seem highlighted by the fact that it has been cited that cremation is utilized at rates as high as 90% in England and as high as 50% in the United States.

In many instances, it is often requested that the dispersal of cremated remains be accomplished over a large, remote or secluded area. This, naturally, lends itself to the utilization of an aircraft in the dispersal process. Unfortunately, because many aircraft move at high speeds or are surrounded by turbulent airflow, the reverent release of cremated remains from an aircraft is a difficult task. As in rapidly moving automobiles, the vehicle itself causes turbulence in the airflow immediately adjacent to its external surfaces. This turbulence usually involves back currents and other such airflows which may tend to disperse the remains in other than the desired direction. This is particularly true in situations where the material to be dispersed includes ashes or other such light particles as in the case of cremated remains. This difficulty is highlighted by the fact that even retired General Chuck Yeager and accomplished aviator Jacqueline Cochran encountered difficulties in attempting to scatter Floyd Cochran's remains over a ranch. As Glennis Yeager related in the popular book "Yeager", "Chuck and another friend took care of that, but some ashes were blown back inside the airplane. Chuck and I agreed that was the way to do things when our time came—only be neater."

The fact that dispersal of cremated remains has heretofore been frequently accomplished on an ad hoc, unprofessional basis makes it unsurprising that little innovation has occurred to produce either a method or an apparatus which can be repeatedly utilized with the desired results. Although United States patents exist for devices which are used to cremate remains (U.S. Pat. No. 4,603,644), for devices which pulverize cremated remains (U.S. Pat. No. 4,621,774), and for vaults or other devices for holding cremated remains (U.S. Pat. Nos. 4,023,316 and 4,669,236), none of these efforts have addressed the dispersal of cremated remains. The only mention in these citations even remotely addressing the problems resolved by the present invention is in U.S. Pat. No. 4,603,644 to Brookes for an Incinerator and Cremator. In that disclosure, Brookes simply mentioned that the movement of ashes from one crematorium to another is accomplished by raking the ash through a port through a sweeping motion. As Brookes recognized, in this fashion, "due reverence can be accorded" by avoiding the mixing of one person's ashes with another's. It is believed that these citations evidence not anticipation, but rather the fact that the problems addressed by the present invention have not been understood and the fact that little innovation has occurred in this area.

Generally, the goals of the present invention are to provide both methods and an apparatus which allow for reverent dispersal of cremated remains in a variety of situations. The present invention accomplishes these goals through providing for the continuous and smooth dispersal of cremated remains among other attributes.

SUMMARY OF THE INVENTION

The present invention relates to the dispersal of cremated remains through both methods and embodiments of an apparatus. It is an object of the present invention to provide an apparatus which releases cremated remains in a continuous and complete fashion.

It is also an object of the invention to provide an apparatus which has no tendency to retain any particles of the cremated remains.

It is also an object of the present invention to release and disperse the cremated remains in a manner in which the remains are dispersed in only one direction.

The present invention further has as an object to provide an apparatus for dispersing cremated remains which may be activated from a location separate from the point at which the remains are released.

A further object of the present invention is to provide for an inexpensive device for the dispersal of cremated remains which can be easily manufactured and which may be made of fabric.

An additional object of the preset invention is to provide for a device for the dispersal of cremated remains which utilizes a rigid container suitable for use in an aircraft.

Another object of the present invention is to provide a device which can be placed and operated by one hand and may include a handle with an integral trigger in the handle.

A fundamental object of the present invention is to provide a method and an apparatus for dispersing cremated remains by which such remains have no tendency to flow backwards, or in other than the desired direction in turbulent air flow.

Another object of the present invention is to provide a method and apparatus for aerial dispersion of cremated remains which allows for such dispersion in a reverent and dignified fashion.

A still further object of the present invention is to provide methods and devices for the dispersion of cremated remains which utilize existing air currents for the dispersal process.

It is also an object of the present invention to disperse cremated remains in a fashion which can leave a pleasant, longlasting final memory to relatives and loved ones of the deceased. Naturally, many other objects of the invention exist as are described herein.

DESCRIPTION OF THE PREFERRED EMBODIMENTS

Figure 1:
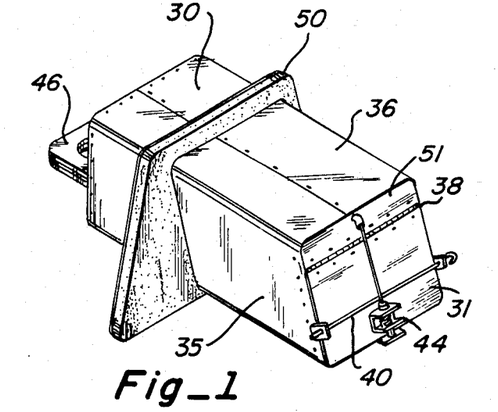
FIG. 1 is a perspective view of the mechanical apparatus with the door in the closed and locked position.
Figures 2, 3, 4:
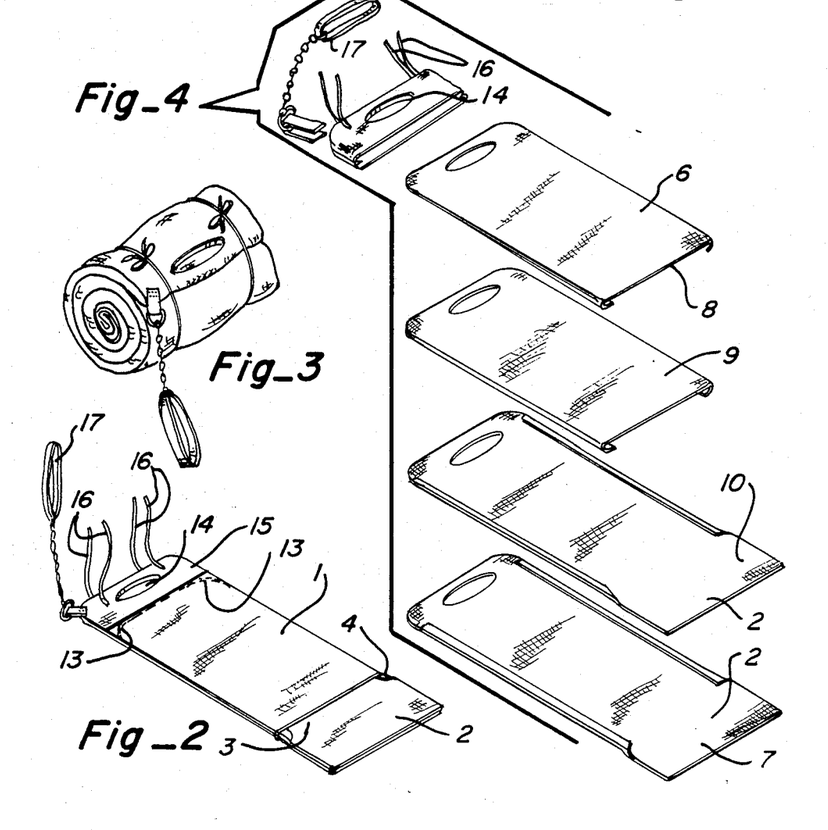
FIG. 2 is a perspective view of the fabric apparatus in the open and unrolled position.
FIG. 3 is a perspective view of the fabric apparatus in the rolled position.
FIG. 4 is an exploded view of the fabric apparatus.

With reference to the drawings, the preferred embodiments of the present invention are as follows:

Referring to FIG. 2, a perspective view of the fabric apparatus, the present invention in a general sense incorporates a sealable container, a means to open the container and a means to prevent retention of any cremated remains within the container. In this embodiment, the sealable container is a fabric bag (1), the means to open the container includes a flap (2), and the means to prevent retention of any cremated remains is the combination of a liner (3), a French seam (4), and a rounded end seam (13). The rounded end seam (13) may be externally created as shown in FIG. 2.

Referring to FIGS. 2 through 6, this particular embodiment is designed for relatively simple and inexpensive construction and use. As is especially evident from FIG. 4, the exploded view of the fabric apparatus, the outer shell (5) is constructed through joining a first section (6) to a second section (7) along three sides. The fourth side (8) of the first section (6) is not joined to the second section (7) and thus forms the opening in the fabric bag (1). This opening is the area through which cremated remains are inserted and out of which cremated remains are dispersed. As can be seen, the second section (7) of the outer shell (5) is longer than the first section (6) of the outer shell (5). This extension forms a flap (2). The flap (2) facilitates the actual insertion of the cremated remains and is of sufficient dimensions so as to be able to be folded over the first section (6) and thus serve to seal the fabric bag (1). This seal formed by the flap (2) is enhanced by the seams between the first section (6) and the second section (7) as is discussed in the context of the type of seam used. As can be understood, this seal is not a perfect seal but is merely enough to prevent any cremated remains from falling or being forced out of the fabric bag (1) at undesirable times. The outer shell (5) can be fabricated from any material, however, due to the nature of the reverence required for dispersing cremated remains, it is suggested that an appropriately formal material such as velvet or velvetine of a dark color be utilized. Such a material not only provides the structural integrity required but it also presents an aesthetic visual image both when the fabric apparatus is open and when it is rolled up.

As mentioned earlier, one of the objects of the present invention is to avoid retention of any of the cremated remains within the container after dispersal. In order to achieve this, the fabric apparatus may utilize a liner (3). Because the purpose of the liner (3) is to prevent retention of any cremated remains, the liner (3) is preferably fabricated from a nontextured material such as a plastic sheet. Although a plastic bag could be utilized as well, it may be desirable to manufacture the inner liner from two sections (9) and (10). These two sections will correspond to the first section (6) and the second section (7) of the outer shell (5) and would be sized accordingly. The liner (3) could then be joined to the outer shell (5) along the edge in which the first section (6) of the outer shell (5) is joined to the second section (7) of the outer shell (5). Naturally the liner (3) could be integral to the inner surface of the outer shell (5), could be a coating on the inner surface of the material used for the outer shell (5), or could even be the outer shell (5) itself and still fall within the spirit of the present invention.

Figure 5:
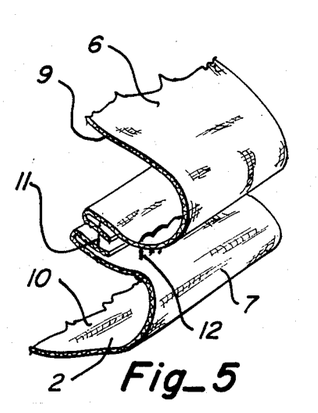
FIG. 5 is an expanded view of a portion of the fabric apparatus showing the French seam construction.

In connecting the first section (6) of the outer shell (5) to the second section (7) of the outer shell (5), a variety of techniques could be employed. Since one goal is avoiding any retention of cremated remains within the container after dispersal, if a type of sewed seam is to be used, it must be chosen carefully. The present embodiment utilizes one type of seam along the sides of the first section (6) and second section (7) and another type of seam along the internal end of the container portion of the apparatus. Referring to FIG. 5, a cross-section view of the side seam, the inner liner (3) and the outer shell (5) can be joined by utilizing the known seamstress technique known as the "French seam". This method involves first joining the inner surface of the first section (6) of the outer shell (5) with the inner surface of the second section (7) of the outer shell (5). Inbetween these outer surfaces are placed the two sections (9) and (10) of the inner liner (3) as appropriate. A first seam (11) is made after which the fabric is folded over itself and a second seam (12) made over the top of the inner surface of the materials. This second seam (12) may be made outside the edges of both the outer shell material and the liner material for appearance as is shown in FIG. 5. In this fashion, a sewed seam is created which presents both an attractive external appearance and serves as a technique to avoid retention of any cremated remains within the fabric apparatus along its side seams.

As was mentioned earlier, the utilization of a french seam offers an unexpected advantage with respect to the seal created when the flap (2) is folded over the first section (6) of the outer shell (5). Because the french seam is an internal seam, the edges of the second section (7) of the outer shell (5) are folded over along a portion of the second section's length as shown in FIGS. 2, 4 and 5. If at the point at which the first section (6) terminates, all of the folded-over portion of the second section (7) is not terminated, when the flap (2) is folded over the first section (6), the seal thus created is enhanced. This occurs by the fact that any tendency of cremated remains to leak out of the container is additionally resisted by the lip formed by the folded-over material of the second section (7).

In order to avoid retention of any cremated remains along the inner edge of the container, the container includes a rounded end seam (13) along the end of the container portion of the apparatus. This rounded end seam (13) serves to prevent cremated remains from lodging in sharp right angle corners deep within the inner liner (3). For manufacturing ease, the rounded end seam (13) may be externally created by traditional stitching through the outer shell (5) and the liner (3) as is shown in FIG. 2. Because of the emotional character of dispersing cremated remains, the rounded end seam (13) is important to avoid any concern over whether the dispersal was in fact complete. In manufacturing the fabric apparatus, the rounded end seam can take a variety of shapes, for instance a semi-circular shape or an eliptical shape may be used. In addition, merely rounded corners could be provided for. Each of these varieties of shapes may be appropriate, the essence being avoiding sharp or right-angle corners in which cremated remains may have a tendency to lodge.

Referring to FIGS. 2 and 4 it can be noticed that the rounded end seam (13) may terminate the container portion of the fabric bag (1) some distance from the end of the material. A handle (14) is provided at the end of the material. Although not functionally necessary, the aspect of terminating the container by a rounded end seam (13) before the end of the material facilitates ease of manufacture and allows for insertion of a cap (15) over the end of the bag. This cap (15) may be served in place in conjunction with the creation of the rounded end seam (13). Referring to FIGS. 2 through 4, the cap (15) serves to reinforce the handle (14), the attachment points of straps (16), and a wrist loop (17). This is important because, again, the reverence afforded cremated remains dictates that the apparatus not be dropped when full, not opened unintentionally, and certainly not be dropped during the dispersal process. The cap (15) may be fabricated of leather and thus provide the structural integrity desired as well as an attractive, formal appearance.

In utilizing the fabric apparatus, it should be noted that the apparatus is sized so as to completely contain varying amounts of cremated remains and so as to optimize its manufacture. It is believed that a width of approximately 10 inches and a length of the internal compartment of approximately 17 inches provides the appropriate volume. The cap (15) may be 3½ inches long and the flap (2) 8 inches long. Naturally other dimensions are possible as well.

From experience it has been discovered that cremated remains of adults vary in amount with a maxmum at approximately 300 cubic inches in volume. Pets of course might be considerably less. To insert this amount into the fabric container, the container is held and the remains are poured into the container at its open end. During this process the flap (2) facilitates the filling of the fabric bag (1). The flap (2) is then folded over the first section (6) of the outer shell (5) to seal the container. The remains are then manually spread evenly through the container by pushing on the outer shell and the container is folded or rolled up from the flap end toward the handle (14). The straps (16) are then tied around the container to hold the container in the rolled position as shown in FIG. 3, in much the same fashion as one would tie a sleeping bag. The container is then carried by the handle (14) to the appropriate place for dispersal. Dispersal is accomplished by placing the wrist loop (17) over one's wrist to avoid inadvertent release of the entire apparatus. At the same time, and perhaps even with the same hand, the container is held by the handle (14). With the other hand the operator then unties the straps (16) to allow the container to unroll through the forces of gravity or existing air currents to release the cremated remains at a point distant from the handle (14).

Figure 6:
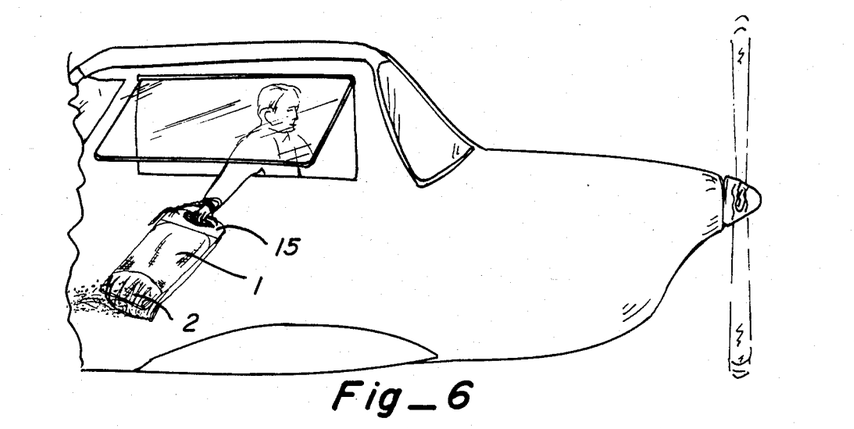
FIG. 6 is a side view of utilization of the fabric apparatus from an aircraft.
Figures 7, 8, 9, 11:
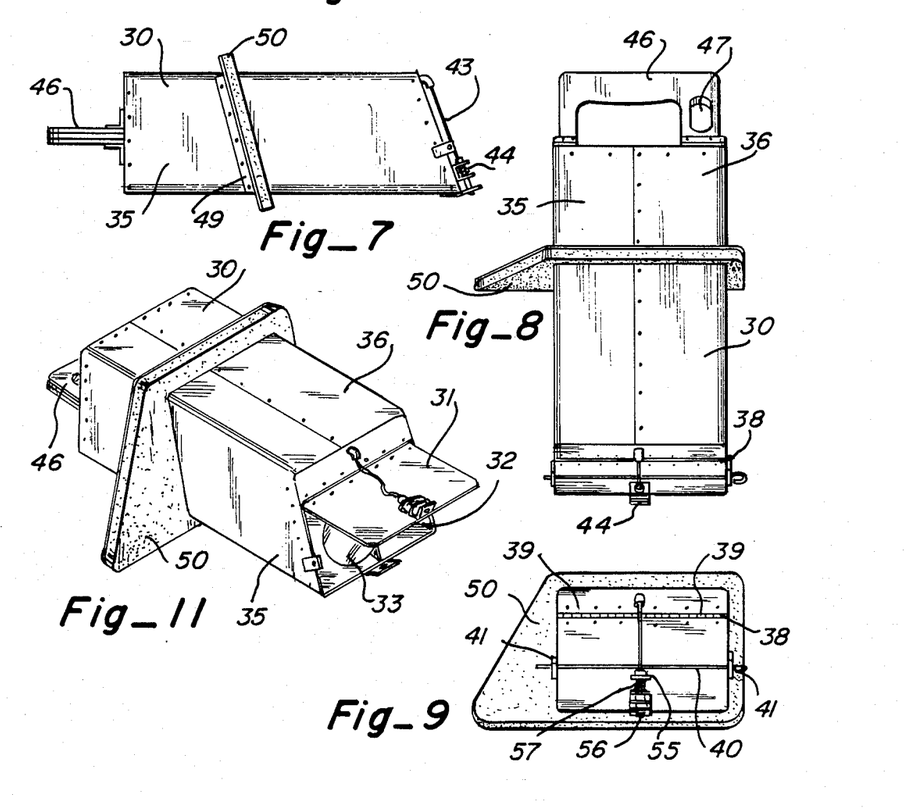
FIG. 7 is an side view of the mechanical apparatus with the door in the closed position.
FIG. 8 is the top view of the mehanical apparatus with the door in the closed position.
FIG. 9 is a front view of the mechanical apparatus showing the pin to lock the door in place.
FIG. 11 is a perspective view of the mechanical apparatus with the door inside open position.
Figure 10:
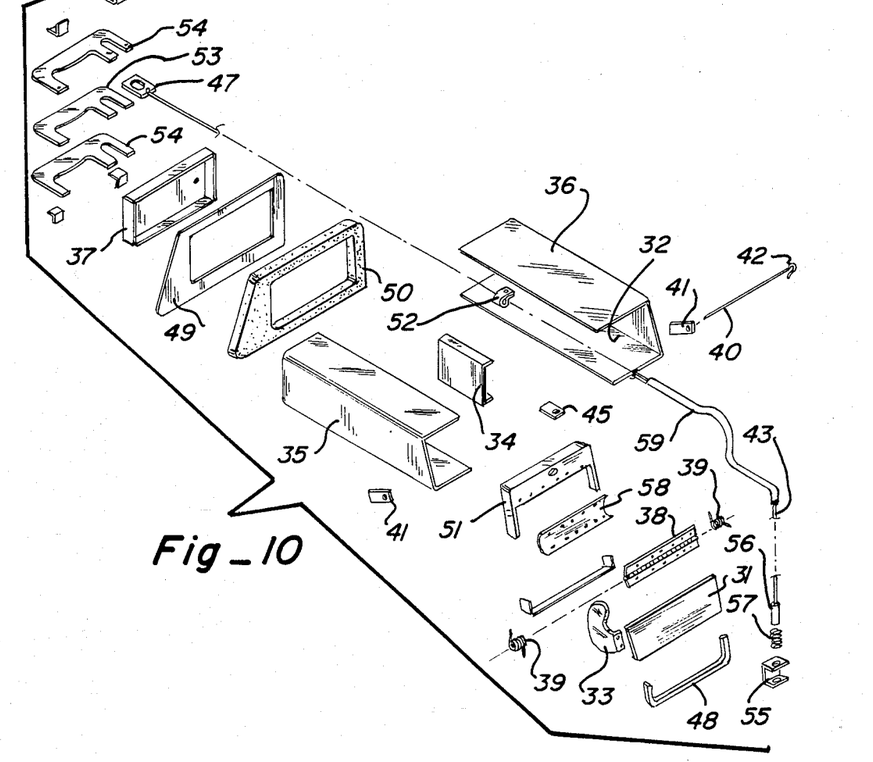
FIG. 10 is an exploded view of the mechanical apparatus.

As shown in FIG. 6, a view showing the utilization of the fabric apparatus from an aircraft, the apparatus is held through an open window and the cremated remains are released from the bottom of the container into the air surrounding the aircraft. This technique affords a number of advantages. First, it allows for the operation of opening the container of the apparatus from a location which is not immediately adjacent to the opening through which the cremated remains disperse. Second, it allows for the release of cremated remains at a point distant from the operator. This is important because the inherent turbulences and air flows in the vicinity of the window of an aircraft or other vehicle frequently involve back currents or other turbulences which may tend to direct cremated remains in a direction other than the one desired. By releasing the cremated remains at the end of an elongated apparatus, the direction of dispersal of the cremated remains is controlled and limited.

Figure 12:
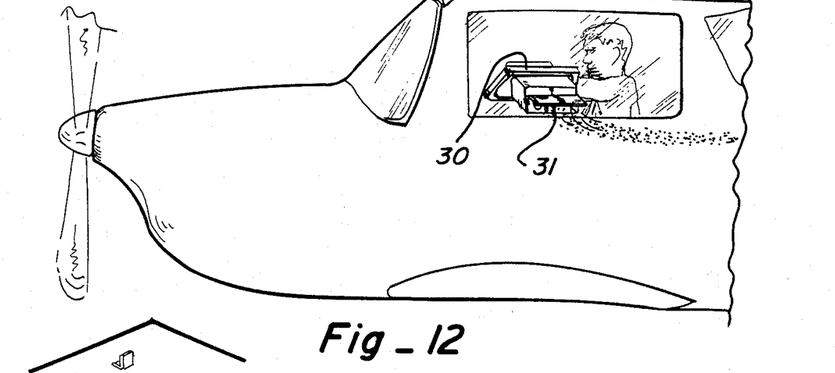
FIG. 12 is a view showing the mechanical apparatus in operation from the small window of a low-wing aircraft.

The described use of the fabric apparatus also addresses two aspects which are relevant to any dispersal of cremated remains: the use of existing air currents and release from a location distant from the point of dispersal. The use of existing air currents is desirable so that those survivors and loved ones are afforded the desired mental image of natural dispersion. By "existing" air currents, it is meant that the apparatus not create any air currents or other dispersal means to create the direction in which dispersal occurs. Although the propeller on an aircraft might create some air currents, the fact that such currents are not created by the dispersal apparatus and that the vast majority of the air currents present are merely the natural result of moving through the air satisfies the need for dispersal by "existing" air currents. As to release at a point distant from the point of dispersal it is desirable that no possibility of the operator coming in contact with the cremated remains exist. Since the straps (16) are untied at the top of the fabric apparatus and since the dispersal occurs at a point near the bottom of the fabric apparatus (approximately 21 inches away) this criteria is satisfied. Naturally further distance is possible by many techniques including utilizing some automated means, such as electronic, optical, or radio means to hold and release the apparatus from the rolled position. Each of these could be activated both separately and also remotely from the fabric apparatus. A long connection such as a cable could also be used, such being separate from but not remote with respect to the container. Natually, such a separate or remote means could also be provided to close the opening of the container after dispersal.

Referring now to FIG. 1, a perspective view of the mechanical apparatus, this figure demonstrates an alternative embodiment of the present invention. As can be recognized and appreciated, the present invention embodies a wide variety of alternatives in manufacture and use. In the mechanical apparatus embodiment shown in FIG. 1, the apparatus is manufactured of rigid materials rather than fabric materials. As shown in FIGS. 1 and 7 through 12, the mechanical apparatus defines a sealable container (30) a means to open the container, in this case a door (31), and a means to prevent retention of any cremated remains within the container. This preventing means is a combination of the designs of the internal surface (32) (shown in FIGS. 10 and 11) of the sealable container (30), the air duct (33), the air baffle (34), and the shape and material used to manufacture the sealable container (30) as will be described later.

As is best shown in FIG. 10, the sealable container is manufactured by the joining of a first side (35) to a second side (36) with an end plate (37) and a face plate (51). When assembled, these portions define a volume and join together in such a fashion that the volume is sealable. On the front of the sealable container (30) is the face plate (51) a door (31). This door is attached to the face plate (51) through a hinge (38) such as a piano hinge which may include springs (39). These springs (39) serve to open the door upon release. In typical operation the door (31) is held shut by a latch composed of a cable (43) having a bolt mechanism (44) at its end. This bolt mechanism (44) engages a hasp (45) attached to the bottom of one side. The bolt mechanism (44) may include a guide (55) through which a bolt (56) and a bolt spring (57) may slide for engagement with the hasp (45) as is well known. The cable (43) passes back either inside or outside the sealable container (30). If passing through the inside of the sealable container (30) as shown, the cable (43) passes through the face plate (51) and through the end plate (37). By allowing the housing (59) of the cable (43) to pass completely through the sealable container (30), the characteristics of the container which allow it to be easily sealed are not impaired. The housing (59) of the cable (43) may be attached to the top of the first side (35) or the second side (36) by means of a clamp (52). This clamp may also be attached through both the first side (35) and the second side (36) at the joint between the two and thus serve to enhance their connection. To the end plate (37) is attached a handle (46). Included in the handle is a separate trigger (47) to which is attached the cable (43). The trigger (47) allows displacement of the cable (43) resulting in opening of the door (31) through the action of the spring (39). The trigger mechanism can be simply manufactured by assembling the handle (46) from a central portion (53) and two outer portions (54). The trigger (47) can then slide inbetween the outer portions (54).

The door (31) can be locked shut by means of a pin (40). This pin slides through apertures (41) attached to either side. The pin (40) may lock in place by means of a catch (42) on the pin (40). The pin (40) serves to lock the door shut and avoid unintentional release of the cremated remains. If the pin (40) is inserted to lock the door (31) shut, accidental displacement of the trigger (47) will not open the door (31). When the door (31) is in the closed position, a seal (48) engages the edges of the sides (35) and (36) to effectively seal the sealable container (30). As can be appreciated, this seal (48) need not have extraordinary sealing capabilities, but rather it needs only to seal so as to prevent any unintentional release or leakage of cremated remains from the sealed container. Assisting in sealing the container is a flexible cover (58) over the hinge (38). This cover (58) may be attached to the door (31) and the face plate (51) by adhesive or other such means and serves to seal the container in the vicinity of the hinge (38) as well as serving to avoid retention of any of the cremated remains after dispersal by the hinge (38). Also, the connections between all components of the sealable container (30) may be sealed by means of a caulk, gasket, or other such sealing techniques. In this embodiment, sealing of the apparatus is important as pressure differentials may exist between the area in the vicinity of the operator and the area at which the cremated remains are dispersed. Attached to the door (31) is an air duct (33) which serves to direct air into the sealable container (30) and may serve to hold the door in the open position. After being directed by the air duct (33), the air then encounters an air baffle (34) which is contained within the sealable container and may be attached to both the top and the bottom of a side. This air baffle (34) serves to further direct the air in one side of the container for the purposes of ensuring complete evacuation and ensuring that there is no retention of cremated remains within the sealable container (30) after use. Naturally both the air duct (33) and the air baffle (34) can take a variety of shapes and positions, their essential functions being as mentioned. In addition to directing air for the purpose of evacuating the sealed container (30), the air duct (33) may also be designed so as to serve to assist in opening and holding the door (31) open. As can be appreciated it is also possible that initial opening of the door could be accomplished by means of an external air duct rather than the springs (39).

With reference to the application of the mechanical apparatus to use in aircraft, the apparatus may include a stop (49) at some point along the external surface of the sealable container (30). This stop (49) may also include an annular seal (50) which may be placed on the side of the stop (49) which is closest to the door (31). Referring now to FIG. 12, a view of the mechanical apparatus utilized in conjunction with an aircraft, the mechanical apparatus may be utilized by placing the door end of the sealable container (30) through the small window common on the left side of low-wing aircraft. This small window is usually a small hinged opening. Because this small window frequently has limited area and a variety of shapes, the crosssectional area of the sealable container (30) may be sized and shaped in conformity with the small window. In this fashion, the door (31) of the sealable container (30) can be placed out the window without restriction. In considering the shape of the cross-sectional area of the mechanical apparatus, as can be appreciated, the shape of the stop may completely surround the circumference of the sealed container (30) and may be of sufficient width to allow utilization of one particular design in a variety of small window shapes in low wing aircraft. The stop (49) then encounters the window and forms a seal against the window by engaging the annular seal (50). The mechanical apparatus is then operated by activation of the trigger (47) which opens the door (31) and releases the cremated remains for dispersion.

In this utilization and in accordance with the objects of the present invention, the annular seal (50) serves to avoid any tendency of the cremated remains to release in other than the desired direction, the air duct (33) and the air baffle (34) serve to ensure complete and continuous evacuation of the container, and the trigger (47) and cable (43) serve to allow release of cremated remains at a point distant from the point of release. Each of these attributes is desirable as discussed in reference to the fabric apparatus.

As discussed earlier, important features of the invention are to avoid retention of any cremated remains and to provide complete and continuous evacuation of the container. By "continuous", it is meant that the cremated remains should all be released in one event. There should be no pulsing of the release as would occur if a container were shook during the dispersal step. By "complete" it is meant that no cremated remains should exist within the container after the one event of dispersal. In addition to those features and attributes mentioned earlier, the present embodiment may include rounded corners and junctions. The assembly utilizing a first side (35) and a second side (36) which join at a flat surface rather than a corner assists this feature by allowing the simple manufacture of rounded corners on each side. Such corners are simple because the sides are designed so as to be manufactured of material such as aluminum which may be bent. The internal surface (32) of the sealable container (30) could be designed in such a fashion and of such materials as to avoid any tendency to retain any particles of the cremated remains in other ways. Mere air flow could be relied upon or a smooth material such as a stainless steel could be utilized and designed in such a fashion that all corners are rounded and that no joints or other junctions present any crevices in which particles might lodge. Naturally, a liner could be included as shown in a prior embodiment. In the context of the mechanical apparatus, however, it is believed that a liner can be avoided through appropriate materials and design, particularly because the material chosen would not present a texture in which particles could lodge such as the inner surface of a velvet or other fabric material would. Of course, in the event a liner were chosen to be included, it could be manufactured of one piece molded plastic with a smooth inner surface or even of a material such as teflon which tends to greatly reduce any tendency of fine particles to adhere to the surface; it could also be disposable. Also it should be understood that in the present embodiment the positioning of the hinge on the top of the device serves to cause the door to release upward and further enhances the character of the present embodiment to avoid any possibility of retaining any of the particles of cremated remains. This is because the forces of gravity and the designs of both the air duct (33) and the air baffle (34) will cause the particles to exit the container in the vicinity of the bottom of the sides (35) and (36).

As can be appreciated, the mechanical apparatus may have a variety of shapes according to the application. Although the volume contained in the sealed container (30) should contain the appropriate volume of up to approximately 300 cubic inches, the cross-sectional shapes may vary according to the application. In the embodiment disclosed in FIG. 10, it should be noted that the handle (46) includes a trigger (47) located immediate adjacent thereto. This location affords an added advantage in that the unit may be operated by one hand. In this fashion, the mechanical apparatus is first held by the handle (46) and positioned by one hand through the small window of a low wing aircraft. With the same hand a finger may activate the trigger (47) to release and disperse the cremated remains. In this fashion the other hand is available for control of the aircraft. This allows one person to both fly the aircraft and disperse the cremated remains without compromise in efficiency or safety.

In addition to the embodiment disclosed by the mechanical apparatus discussed previously, other devices fall within the spirit of the present invention. Such devices may be attached externally to an aircraft. In this instance a device similar to the mechanical apparatus in operation but perhaps shaped in a streamline fashion might be attached to the strut or other such external portion of an aircraft. This type of device might be operated through a longer cable or even through some remotely controlled release technique. Also in keeping with the spirit of the present invention, additional embodiments which are designed to fit within the external surface of the aircraft and which release cremated remains outside the external surface of the aircraft are possible. For instance, a sealable container might be located in the floor of an aircraft such that it might be filled from within the aircraft and then activated to release cremated remains through a door or other opening in the belly of the aircraft. Additionally, such a design might be located in the tail cone of an aircraft or perhaps within a wingtip of an aircraft. In assessing the variety of locations available, it is necessary to consider not only volumes within a particular aircraft in which the appropriate container could be located but also areas in which any regulatory concern over modification of an aircraft can be minimized. Certainly location of the container along the lateral axis of an aircraft within the vicinity of its center of gravity would be desirable to avoid any impact on weight and balance requirements of an aircraft. Alternatively, location of the container within the tail cone of an aircraft may afford an aesthetic release of the cremated remains and would avoid any possibility of remains contacting any portion of the aircraft. In accordance with the spirit of the present invention, any devices of these potential embodiments would require a means for ensuring complete and continuous evacuation of the container, a means for filling the container, and a means for ensuring that none of the cremated remains are retained by the container itself.

In understanding the degree to which complete and continuous evacuation of the container is provided for, it should be understood that in all of the embodiments discussed there is no need for shaking or other actions to ensure complete evacuation. This is important because of the reverence necessary for the event and to avoid any unanticipated or undesirable difficulty in dispersing the cremated remains since such an event may be done in front of relatives of the deceased. The mere use of some sort of bag or other device which does not include a means to avoid retention of remains as discussed in the prior embodiments is thus undesirable not only from the standpoint of the actual actions of dispersal which would potentially include shaking or even turning the bag inside out but also from the standpoint of concerns of relatives of the deceased that no particles of th cremated remains be retained by the container or bag and thus become intermingled with a subsequent dispersal or perhaps be irreverently disposed of.

In the context of the methods presented by the present invention, it should be understood that no particular apparatus design is required. The methods presented by the present invention relate primarily to the important steps of directing the cremated remains in only one direction and also to steps which ensure continuous and complete evacuation of the container. It should also be understood that these methods and the embodiments of the apparatus presented may be applied in a variety of situations. Although a substantial amount of discussion has been directed to applying these methods in the context of dispersion from an aircraft, this focus is presented for two reasons—namely that aerial dispersion is a frequently desired technique and that dispersion from a rapidly moving aircraft presents one of the more difficult dispersion techniques. Such a focus is not meant to limit the application of both the methods and apparatus presented by the present invention, it being understood that any of the methods and indeed any of the embodiments of the apparatus presented could be applied in the context of dispersing cremated remains from an automobile, from other types of aircraft, from a horse or even from a cliff or tall building. Each of these dispersal techniques would fall within the spirit of the present invention so long as the essential principles involved in the methods were followed or so long as any apparatus falling within the present invention were utilized. Similarly the dispersal of the cremated remains of other than humans (such as dogs, cats, or other pets) is also within the spirit of the present invention.

I claim:

1. An apparatus for dispersing cremated remains comprising:
   a. a sealable container having an outlet from which said cremated remains may be dispersed;
   b. a means for opening said container;
   c. a means for preventing retention of any cremated remains within said container; and
   d. a means for directing air into said container at said outlet.

2. An apparatus for dispersing cremated remains as described in claim 1 which further comprises a means for evacuating the cremated remains from said container in a continuous and complete manner.

3. An apparatus for dispersing cremted remains as described in claim 2 in which said means for evacuating utilizes existing air currents.

4. An apparatus for dispersing cremated remains as described in claims 1 or 2 which further comprises a means for avoiding any tendency of the cremated remains to disperse in other than the desired direction.

5. An apparatus for dispersing cremated remains as described in claims 1 or 2 which further comprises a means for activating the opening means, said means for activating being located separate from said opening means.

6. An apparatus for dispersing cremated remains as described in claim 2 which further comprises:
   a. a means for avoiding and tendency of the cremated remains to disperse in other than the desired direction; and
   b. a means for activating said opening means which is located separate from said opening means.

7. An Apparatus for dispersing cremated remains as described in claim 1 wherein said container is made of rigid material.

8. A Mechanical Apparatus for dispersing cremated remains comprising:
   a. a sealable container which is openable and has an internal and an external surface;
   b. a door sealably attached to the container;
   c. a handle attached to the outside of the container; and
   d. a means for activating the opening of said door.
   e. a duct attached to said door for directing air into said container.

9. A Mechanical Apparatus for dispersing cremated remains as described in claim 8 which further comprises a means for closing said door.

10. A Mechanical Apparatus for dispersing creamated remains as described in claim 8 in which said activating means is located on said handle.

11. A Mechanical Apparatus for dispersing cremated remains as described in claime 8 in which said activating means ids separate from said container.

12. A Mechanical Apparatus for dispersing cremated remains as described in claim 10 wherein said door further comprises a spring for opening said door.

13. A Mechanical Apparatus for dispersing cremated remains as described in claim 12 which further comprises an air baffle attached to and contained within said container.

14. A Mechanical Apparratus for dispersing cremated remains as described in claim 13 which further comprises a means for locking said door in the closed position.

15. A Mechanical Apparatus for dispersing cremated remains as described in claim 14 which further comprised a stop attached to the external surface of said container.

16. A Mechanical Apparatus for dispersing cremated remains as described in claim 15 wherein said stop further comprises an annular seal which traverses the circumference of said container in the vicinity of said stop.

17. A Mechanical Apparatus for dispersing cremated remains as described in claim 16 which further comprises a means for avoiding retention of any remains within said container.

18. A Mechanical Apparatus for dispersing cremated remains as described in claim 17 wherein said avoiding means utilizes an inner surface which is smoothly curved.

19. A Mechanical Apparatus for dispersing cremated remains as described in claim 17 which further comprises a means for evacuating said container in a continuous and complete manner.

20. A Mechanical Apparatus for dispersing cremated remains as described in claim 19 wherein said evacuating means utilizes existing air currents.

21. A Mechanical Apparatus for dispersing cremated remains as described in claim 22 which further comprises a means for dispersing the cremated remains which utilizes existing air currents.

* * * * *